United States Patent Office 3,127,426
Patented Mar. 31, 1964

3,127,426
3-HALO ANDROSTENES
Albert Bowers and Percy George Holton, Mexico City, Mexico, assignors, by mesne assignments, to Syntex Corporation, a corporation of Panama
No Drawing. Filed Dec. 4, 1961, Ser. No. 156,983
10 Claims. (Cl. 260—397.3)

The present invention relates to novel cyclopentanophenanthrene derivatives and to a process for the production thereof.

More particularly the present invention relates to 3-chloro-$\Delta^2$-androsten-17$\beta$-ol derivatives and to novel intermediates in the production thereof.

The novel compounds of the present invention are represented by the following formula:

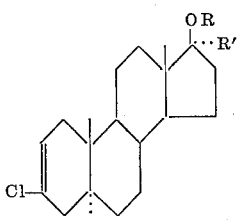

In the above formula R represents hydrogen or acyl; $R^1$ may be hydrogen, lower alkyl, lower alkenyl or lower alkinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formula wherein $R^1$ is hydrogen or lower alkyl have anti-androgenic properties and exhibit anti-estrogenic and anti-gonadotrophic activities. In addition these compounds lower the blood, serum and liver cholesterol levels.

The compounds represented by the above formula wherein $R^1$ is lower alkenyl or lower alkinyl also exhibit progestational activity.

The novel compounds of the present invention are prepared by the process illustrated by the following equation:

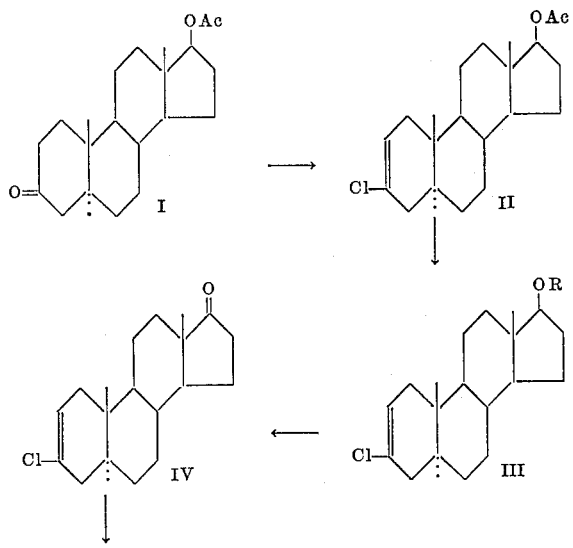

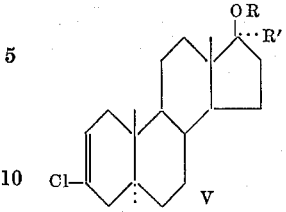

In the above formulas R and $R^1$ have the same meaning as previously set forth and Ac represents the acetyl group.

In practicing the process just outlined, the starting compound which is dihydrotestosterone acetate is treated with phosphorus pentachloride in an inert solvent preferably carbon tetrachloride, thus furnishing 3-chloro-$\Delta^2$-androsten-17$\beta$-ol acetate (II). Conventional saponification of this compound with for example, potassium hydroxide in methanol, yields 3-chloro-$\Delta^2$-androsten-17$\beta$-ol (III: R=H) which upon oxidation, preferably with chromium trioxide in pyridine, affords 3-chloro-$\Delta^2$-androsten-17-one (IV). Treatment of this compound with a lower alkyl, lower alkenyl or lower alkinyl magnesium halide as for example methyl, vinyl or ethinyl magnesium bromide, yields the corresponding 3-chloro-17$\alpha$-lower (alkyl, alkenyl or alkinyl)-$\Delta^2$-androsten-17$\beta$-ol (V: R=H). These compounds are conventionally acylated in the presence of p-toluenesulfonic acid with an acylating agent as for example acetic acid or propionic acids to give the corresponding 17-acylates.

The aforementioned 3-chloro-$\Delta^2$-androsten-17$\beta$-ol (III: R=H) is conventionally acylated in pyridine with an acylating agent as for example an anhydride of a hydrocarbon carboxylic acid of the type described hereinbefore to give the corresponding 17-acylate.

The following specific examples serve to illustrate but are not intended to limit the scope of the present invention:

*Example I*

A mixture of 4 g. of dihydrotestosterone acetate, 6 g. of phosphorus pentachloride and 60 cc. of carbon tetrachloride was refluxed for 2 hours in the absence of moisture. It was then cautiously poured into water. The organic layer was washed several times with water, dried over sodium sulfate and evaporated to dryness furnishing 3-chloro-$\Delta^2$-androsten-17$\beta$-ol-acetate.

*Example II*

A solution of 3 g. of the latter compound in 150 cc. of methanol was refluxed for 3 hours with 1.5 g. of potassium hydroxide dissolved in 3 cc. of water; it was then poured into ice water, the precipitate collected, washed with water to neutral and dried, thus producing a crude compound which upon recrystallization from methylene chloride-ether afforded 3-chloro-$\Delta^2$-androsten-17$\beta$-ol.

*Example III*

A solution of 6 g. of 3-chloro-$\Delta^2$-androsten-17$\beta$-ol (obtained in accordance with the foregoing example) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-chloro-$\Delta^2$-androsten-17-one.

Example IV

A solution of 5 g. of the latter compound in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-3-chloro-Δ²-androsten-17β-ol.

Example V

Following exactly the technique described in the preceding example except that methyl magnesium bromide was substituted by vinyl magnesium bromide or ethynyl magnesium bromide, there were correspondingly obtained 17α-vinyl-3-chloro-Δ²-androsten-17β-ol or 17α-ethynyl-3-chloro-Δ²-androsten-17β-ol.

Example VI

A mixture of 1 g. of 3-chloro-Δ²-androsten-17β-ol, 4 cc. of pyridine and 2 cc. of propionic anhydride was kept at room temperature overnight, poured into ice water, the formed precipitate was filtered, washed with water and dried. Crystallization from acetone-hexane gave 3-chloro-Δ²-androsten-17β-ol-propionate.

Example VII

Following the procedure described in the preceding example, but substituting propionic anhydride by caproic anhydride, cyclopentylpropionic anhydride and benzoyl chloride there were obtained respectively 3-chloro-Δ²-androsten-17β-ol-caproate, 3-chloro-Δ²-androsten-17β-ol-cyclopentylpropionate and 3-chloro-Δ²-androsten-17β-ol-benzoate.

Example VIII

A mixture of 1 g. of 17α-methyl-3-chloro-Δ²-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 17α-methyl-3-chloro-Δ²-androsten-17β-ol-acetate.

When applying this procedure to 17α-vinyl-3-chloro-Δ²-androsten-17β-ol and 17α-ethynyl-3-chloro-Δ²-androsten there were correspondingly obtained 17α-vinyl-3-chloro - Δ² - androsten-17β-ol-acetate and 17α-ethynyl-3-chloro-Δ²-androsten-17β-ol-acetate.

Example IX

Following the technique described in the preceding example, but substituting acetic anhydride by propionic anhydride, caproic anhydride and cyclopentylpropionic anhydride, there were obtained correspondingly the propionates, caproates and cyclopentylpropionates of the starting compounds named in the same example.

We claim:

1. A compound of the following formula:

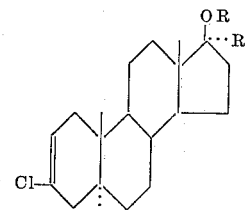

wherein R is selected from the group consisting of hydrogen and a hydrocarbon carboxylic acyl group of less than 12 carbon atoms and $R^1$ is a member of the group consisting of hydrogen, lower alkyl, lower alkenyl and lower alkynyl.

2. 3-chloro-Δ²-androsten-17β-ol.
3. 3-chloro-Δ²-androsten-17-one.
4. 17α-methyl-3-chloro-Δ²-androsten-17β-ol.
5. 17α-vinyl-3-chloro-Δ²-androsten-17β-ol.
6. 17α-ethynyl-3-chloro-Δ²-androsten-17β-ol.
7. The 17-esters of hydrocarbon carboxylic acids of less than 12 carbon atoms of 3-chloro-Δ²-androsten-17β-ol.
8. The 17-esters of hydrocarbon carboxylic acids of less than 12 carbon atoms of 17α-methyl-3-chloro-Δ²-androsten-17β-ol.
9. The 17-esters of hydrocarbon carboxylic acids of less than 12 carbon atoms of 17α-vinyl-3-chloro-Δ²-androsten-17β-ol.
10. The 17-esters of hydrocarbon carboxylic acids of less than 12 carbon atoms of 17α-ethynyl-3-chloro-Δ²-androsten-17β-ol.

References Cited in the file of this patent

UNITED STATES PATENTS 3,055,916   Bowers et al.  ---------- Sept. 25, 1962

OTHER REFERENCES

Mamlok et al.: Chem. Abstracts, vol. 54, 19765 (1960).